United States Patent Office 3,562,200
Patented Feb. 9, 1971

3,562,200
POLYETHYLENE TEREPHTHALATE CONTAINING ETHYLENE COPOLYMERS
Michael Edward Benet Jones, Runcorn, and Eric Nield and Charles Richard Hart, Welwyn Garden City, England, assignors to Imperial Chemical Industries Limited, London, England, a corporation of Great Britain
No Drawing. Filed Aug. 22, 1968, Ser. No. 754,741
Claims priority, application Great Britain, Aug. 29, 1967, 39,484/67
Int. Cl. C08g 39/10, 51/04
U.S. Cl. 260—40                      16 Claims

ABSTRACT OF THE DISCLOSURE

Thick walled-shaped articles of crystallised poly(ethylene terephthalate) containing finely dispersed discrete particles of a rubbery copolymer of ethylene and an ethylenically unsaturated ester, e.g., an alkyl acrylate, hydroxyalkyl acrylate or vinyl alkanoate; compositions suitable for conversion to these shaped articles and methods of producing the shaped articles from the compositions.

This invention relates to shaped articles of poly(ethylene terephthalate) based polymer compositions and to the compositions from which they may be obtained.

Poly(ethylene terephthalate), when of sufficiently high molecular weight, is a high melting, readily crystallisable polymer which has found extensive use as a film- and fibre-forming material. Thick-walled shaped articles of crystallised poly(ethylene terephthalate), however, have tended to be brittle and an improvement in toughness would be desirable. By thick-walled shaped articles we mean those whose wall thickness is such that they are not easily susceptible to drawing operations. Such articles are commonly obtained, for example, from injection-moulding operations.

We have now found that if the shaped articles contain a proportion of certain synthetic rubbery polymers, improvements in toughness (e.g., as reflected in notched impact strength) may be obtained.

According to the present invention we provide a thick-walled shaped article of crystallised poly(ethylene terephthalate) having finely dispersed therein discrete particles of an amorphous or poorly crystalline high molecular weight copolymer of ethylene and a carboxylic acid ester containing terminal ethylenic unsaturation, which copolymer has a glass/rubber transition temperature below 0° C., and a dynamic modulus not greater than $4 \times 10^9$ dynes/cm.$^2$, and forms from 1 to 50% by weight of the mixture of poly(ethylene terephthalate) and copolymer.

According to a further embodiment of the invention we provide a mouldable composition comprising poly-(ethylene terephthalate) and an amorphous or poorly crystalline high molecular weight copolymer of ethylene and a carboxylic acid ester containing terminal ethylenic unsaturation, which copolymer has a glass/rubber transition temperature below 0° C. and a dynamic modulus not greater than $4 \times 10^9$ dynes/cm.$^2$, and forms from 1 to 50% of the mixture of poly(ethylene terephthalate) and copolymer.

By poly(ethylene terephthalate) we mean not only the homopolymer of ethylene glycol and terephthalic acid but also copolymers wherein, for example, some of the ethylene glycol residues are replaced by other diol residues, e.g., diethylene glycol, and/or some of the terephthalic acid residues are replaced by other dicarboxylic residues, e.g., isophthalic acid, provided that the ethylene terephthalate residues form at least 90 mole percent of the polymer chain.

It is preferred that the poly(ethylene terephthalate) used in the blends of our invention has a molecular weight corresponding to an intrinsic viscosity, as hereinafter defined, of at least 0.4 decilitre gm.$^{-1}$, as measured in o-chlorophenol at 25° C., and more preferably at least 0.6 decilitre gm.$^{-1}$, in order to provide shaped articles of desirable physical properties. Poly(ethylene terephthalate) of very high molecular weight, on the other hand, may prove difficult to mould because of its very high viscosity in the melt.

By intrinsic viscosity we mean the value obtained by plotting values of the fraction $$\frac{t-t_0}{t_0 c}$$

where $t$ is the flow time of a "$c$" gms. decilitre$^{-1}$ solution of the polymer in a given solvent through a given viscometer, and $t_0$ is the flow time of the same volume of pure solvent through the same viscometer under the same conditions, against the concentration $c$ for various values of $c$, and extrapolating the curve obtained to zero concentration. All figures for intrinsic viscosity in this specification are based on measurements derived from solutions of the polymer in o-chlorophenol at 25° C. The fraction identified above is sometimes known as the reduced viscosity for a given solution concentration.

Examples of copolymers suitable for use as the other component of the composition may be found among the random copolymers of ethylene with $C_{1-8}$ alkyl esters of acrylic and methacrylic acid, with vinyl alkanoates, and/or with hydroxy $C_{1-8}$ alkyl esters of acrylic and methacrylic acids. By way of specific example may be mentioned copolymers of ethylene with methyl methacrylate, ethyl acrylate, n-butyl acrylate, 2-ethyl hexyl acrylate, vinyl acetate, 2-hydroxyethyl methacrylate and hydroxypropyl methacrylate (obtained from methacrylic acid and propylene-1,2-oxide, for example). The copolymers may be formed from mixtures of two or more of these esters if desired, and may also contain small amounts of the residues of other ethylenically unsaturated monomers copolymerisable with ethylene and the ester or esters.

To be suitable for use in accordance with our invention, the copolymer must satisfy the following requirements:

(1) It must be amorphous or at most only poorly crystalline, by which we mean that it exhibits no more than weak crystallinity on X-ray examination. That is, the crystallinity pattern, if any, consists of a series of diffuse bands.

(2) It must have a glass/rubber transition temperature below 0° C. The glass/rubber transition temperature may be measured by differential thermal analysis.

(3) It must have a dynamic modulus not greater than $4 \times 10^9$ dynes/sq. cm. The dynamic modulus is measured at 20° C. by the torsion pendulum method using a frequency of about 1 cycle per second.

It will also be understood that since the copolymer is required in the form of finely dispersed discrete particles in the poly(ethylene terephthalate) matrix, it must be substantially insoluble in that polymer. In general, it may be said that if the calculated solubility parameter of the copolymer differs from that of poly(ethylene terephthalate) by more than 0.2, it will be substantially insoluble therein. The solubility parameter is calculated by the method according to Small as described in the Journal of Applied Chemistry, vol. 3, 1953, pages 71 to 80.

The copolymer must also, of course, be able to withstand the temperatures at which shaping is carried out without deteriorating to such an extent as to render the shaped products valueless.

The compositions may be formed by any conventional mixing technique. Preferably, however, the mixing is effected so as to produce a product wherein the copolymer is found as finely dispersed discrete particles in a poly(ethylene terephthalate) matrix. For example, a mixture of poly(ethylene terephthalate) and the copolymer may be melted and mixed, for example by extrusion. The extrudate may then be granulated or otherwise reduced to a form suitable for use in the shaping, e.g., injection-moulding, machine.

Alternatively, the poly(ethylene terephthalate) and the copolymer may each be dissolved in a solvent which is a common solvent for the two materials, for example diphenyl ether or nitrobenzene, the solutions mixed and the polymer mixture recovered either by removing the solvent, for example by evaporation, or by precipitation by pouring the solution into a nonsolvent.

It is not necessary that the composition contain the copolymer as finely dispersed particles in a poly(ethylene terephthalate) matrix provided that the shaping process converts it to such a form in the shaped product. Thus, for example, where the shaping is effected in a screw-fed injection-moulding machine, the feed to the hopper of the screw may be a simple mixture of the two components since the required effect may be achieved in the screw portion of the machine.

It is preferred that the particles of copolymer in the shaped article have a maximum dimension not greater than 10 microns.

The rubbery material should form at least 1% by weight of the composition since below this amount little effect is obtained. Where the rubbery material forms more than 50% by weight of the composition, however, the advantages gained from the inherent strength and stiffness of the poly(ethylene terephthalate) may be reduced to an undesirable extent. In general, it is preferred to use quantities of the rubbery material in the blend in the range 5% to 35%, and preferably 5% to 25%, by weight of the composition, such a range generally providing the optimum balance of toughness and strength properties in the composition.

The compositions may include further components if desired, e.g., heat and light stabilisers, lubricants, pigments, dyes, mould release agents and fillers, for example finely powdered metals, finely powdered metal oxides, graphite, carbon black, ground glass and molybdenum disulphide. Reinforcing agents, e.g., asbestos fibre and especially glass fibre may also be included, if desired. These components may be included during the mixing of the copolymer with the poly(ethylene terephthalate), or they may be added to one or other of these materials before the two are mixed. In yet a further alternative they may be added in a separate step to the already formed mixture.

The compositions may be shaped, e.g., by extrusion and especially injection-moulding, to give shaped articles containing crystallised poly(ethylene terephthalate) and exhibiting improved impact strength (by which we mean notched impact strength) compared with articles formed of crystallised poly(ethylene terephthalate) alone.

In order to ensure that the poly(ethylene terephthalate) is in a crystallised form in the shaped articles, one or more of the following procedures may be adopted:

(1) The article may be shaped in a mould heated to at least 100° C. and preferably 120° C. to 170° C. Temperatures above 200° C. are preferably avoided if degradation of the poly(ethylene terephthalate) is to be kept to a minimum. The article should be kept in the mould for a sufficient time to allow crystallisation; times of from a few seconds to 2 to 3 minutes being generally adequate.

(2) Alternatively, the shaped article may be subjected to a heat-treatment after shaping. Temperatures of from about 120° C. to about 200° C. are suitable and times of up to about 40 minutes are usually adequate.

(3) The composition may be kept as little as possible, e.g., not more than 10° C., above the melting point of poly(ethylene terephthalate) during the shaping process; e.g., in the barrel of the extruder or injection-moulding machine.

(4) A nucleating agent may be added to the composition before shaping so as to speed crystallisation, thereby reducing the residence time required in the hot mould, or the period required for the heat treatment. The nature and amount of nucleating agent required to be effective depends to some extent upon the nature of the catalyst residues in the poly(ethylene terephthalate). If the polymer used contains a sufficient concentration of insoluble catalyst residues, no further nucleation may be required. If, on the other hand, the catalyst residues are soluble in the polymer, it is generally desirable to add a nucleating agent. The nucleating agent is preferably a very finely divided inorganic material. Talc and pyrophyllite have been found to be particularly effective, even in the presence of nucleating amounts of insoluble catalyst residues. Concentrations of from about 0.01 to about 2% are usually adequate, the particle size being preferably as fine as possible, e.g., 2 microns in size or less.

The nucleating agent may be added during the formation of the poly(ethylene terephthalate), or at any later stage before shaping.

All the components of the shaping composition are preferably kept as dry as possible because of the known deleterious effect of moisture upon molten poly(ethylene terephthalate). The composition is also kept as dry as possible and it is preferred to take steps to exclude moisture during the shaping process.

The invention is illustrated by the following examples in which all proportions are in parts by weight unless otherwise indicated.

The copolymers used in the examples are identified as follows:

EMMA(1)

A poorly crystalline random copolymer of ethylene (70.2% by weight) and methyl methacrylate (29.8% by weight), having a glass/rubber transition temperature of −33° C., a melt flow index at 190° C. of 3.0 (ASTM Test D1238), a dynamic modulus of below $4 \times 10^9$ dynes/sq. cm., and a solubility parameter differing from that of poly(ethylene terephthalate) by at least 0.2.

EMMA(2)

A poorly crystalline random copolymer of ethylene (82.6% by weight) and methyl methacrylate (17.4% by weight), having a glass/rubber transition temperature of −30° C., a melt flow index at 190° C. of 3.2 (ASTM Test D1238), a dynamic modulus of below $4 \times 10^9$ dynes/sq. cm., and a solubility parameter differing from that of poly(ethylene terephthalate) by at least 0.2.

EMMA(3)

A poorly crystalline random copolymer of ethylene (66% by weight) and methyl methacrylate (34% by weight), having a glass/rubber transition temperature of −30° C., a melt flow index at 190° C. of 1.4 (ASTM Test D1238), a dynamic modulus of below $4 \times 10^9$ dynes/ sq. cm., and solubility parameter differing from that of poly(ethylene terephthalate) by at least 0.2.

EEA(1)

A poorly crystalline random copolymer of ethylene (87% by weight) and ethyl acrylate (13% by weight), having a glass/rubber transition temperature of −47° C., a reduced viscosity (measured on a 1% solution in chloroform at 25° C.) of 1.66, a dynamic modulus of below $4 \times 10^9$ dynes/sq. cm., and a solubility parameter differing from that of poly(ethylene terephthalate) by at least 0.2.

EEA(2)

A poorly crystalline random copolymer of ethylene (78% by weight) and ethyl acrylate (22% by weight), having a glass/rubber transition temperature of −46° C., a reduced viscosity, measured as for EEA(1), of 1.92, a dynamic modulus of below $4 \times 10^9$ dynes/sq. cm., and a solubility parameter differing from that of poly(ethylene terephthalate) by at least 0.2.

EVA

A poorly crystalline random copolymer of ethylene (74% by weight) and vinyl acetate (26% by weight), having a glass/rubber transition temperature of −26° C., a reduced viscosity, measured as for EEA(1), of 1.99, a dynamic modulus of below $4 \times 10^9$ dynes/sq. cm., and a solubility parameter differing from that of poly(ethylene terephthalate) by at least 0.2.

EHEMA

A poorly crystalline random copolymer of ethylene (92% by weight) and 2-hydroxyethyl methacrylate (8% by weight), having a glass/rubber transition temperature below 0° C., a reduced viscosity measured as for EEA(1), of 1.70, a dynamic modulus of below $4 \times 10^9$ dynes/sq. cm., and a solubility parameter differing from that of poly(ethylene terephthalate) by at least 0.2.

In each example, the copolymers were dried at 50° C. under high vacuum before used and the poly(ethylene terephthalate) was dried at 140° C. under vacuum for at least 6 hours before use.

Example 1

1000 parts of dry poly(ethylene terephthalate) chip, of intrinsic viscosity 1.35 decilitres gm.$^{-1}$, were tumble blended with 5.5 parts of finely divided talc and 100 parts of EMMA(1) and the coarse mixture was then fed through a 3.20 cm. diameter screw extruder at a barrel temperature of 260° C., a screw speed of 80 r.p.m. and an extrusion rate of 120 gms. min.$^{-1}$. The extrudate was quenched in cold water, granulated, and dried at 110° C. under a vacuum of 0.2 mm. Hg for 22 hours.

The dried granules were then injection-moulded in a 2-ounce Stübbe machine operating at a barrel temperature of 265° C., an injection pressure of 2000 lbs./sq. in. and an injection time of 25 seconds. The mould was a family mould designed to produced twelve barlike pieces, six measuring 50 mm. x 6 mm. x 3 mm., and six measuring 50 mm. x 9 mm. x 3 mm. The mould was held at 140° C. and a cooling time of 40 seconds was allowed in the mould.

Differential thermal analysis of a sample of such a moulding showed no crystallisation peak on heating, and a melting peak at 252° C. A quenched sample showed a Tg at 79° C., and X-ray examination of the mouldings showed them to be crystalline. Optical examination of sections of the mouldings taken perpendicular to the direction of flow, showed the rubber to be dispersed as discrete particles having an average particle size of 2 to 3μ.

The 50 mm. x 6 mm. x 3 mm. mouldings were given a 45° notch 2.80 mm. deep and of 0.254 mm. radius, and the impact strengths determined on a Hounsfield Charpy type impact tester.

The average impact strength of these notched samples was found to be 6.1 kg. cm./cm.$^2$ at 22° C.

Samples were then granulated, shaken with cold o-chlorophenol for several hours and filtered to remove the suspended rubber. The poly(ethylene terephthalate) was then precipitated by pouring the solution into vigorously stirred toluene. The precipitated polymer was filtered, washed repeatedly with fresh boiling toluene and dried at 110° C. for 6 hours. I.R. Examination showed that it was free from ethylene copolymer. The dried polymer was found to have an intrinsic viscosity of 0.88 decilitre gm.$^{-1}$, measured in o-chlorophenol at 25° C. The notched impact strength of poly(ethylene terephthalate) mouldings of the same intrinsic viscosity prepared under identical conditions, but without the blended rubber, was measured as 3.4 to 4.1 kg. cm./cm.$^2$.

Example 2

500 parts of dried poly(ethylene terephthalate) of intrinsic viscosity 0.81 decilitre gm.$^{-1}$ were mixed with 2.5 parts of talc and 100 parts of EMMA(1) as described in Example 1. The resulting blend was injection moulded as described in Example 1, and the notched impact strengths of the 50 mm. x 6 mm. x 3 mm. samples (measured as described in Example 1) were determined as 4.89 kg. cm./cm.$^2$ at 22° C.

A sample of the same poly(ethylene terephthalate) extruded with 0.5% by weight of talc and injection moulded as above had a notched impact strength of 1.47 kg. cm./cm.$^2$.

Example 3

A composition formed of poly(ethylene terephthalate) of intrinsic viscosity 0.65, 0.5% by weight of talc and 15 wt. percent of EMMA(1) was prepared and injection moulded by the procedure described in Example 1. The 50 mm. x 6 mm. x 3 mm. samples showed notched impact strengths of 3.89 kg. cm./cm.$^2$.

Differential thermal analysis of the moulded samples showed no crystallisation peak on initial heating. The peak of the melting point curve occurred at 254° C. and quenched samples showed a Tg at 74° C.

Optical examination of sections of mouldings showed the rubber phase to be dispersed as discrete particles of average size 1–3μ. The rubber particles near the surface of the mouldings showed some distortion, being drawn out along the direction of flow.

Example 4

500 parts of dry poly(ethylene terephthalate), of intrinsic viscosity 1.097 decilitres gm.$^{-1}$, were mixed with 2.5 parts of talc and 75 parts of EMMA(2) by the procedure of Example 1. The composition was injection moulded to give impact test pieces, as described in Example 1. The notched impact strengths of the test pieces were determined to be 4.82 kg. cm./cm.$^2$ at 22° C., following the procedure described in Example 1.

The notched impact strength of the same poly(ethylene terephthalate) processed as described above, but without the rubber, was 3.80 kg. cm./cm.$^2$ at 22° C.

Example 5

Dry poly(ethylene terephthalate) (500 parts), of intrinsic viscosity 0.65 decilitre gm.$^{-1}$, was extruded with talc (2.5 parts) and 50 parts of EEA(1). The extrudate was granulated, dried and injection moulded under conditions similar to those described in Example 1 to give impact test pieces. The notched impact strengths of the test pieces were determined as 3.12 kg. cm./cm.$^2$ at 22° C., following the procedure described in Example 1.

Injection moulded articles could also be obtained under similar conditions from compositions which had been modified by the addition of 20–50% by weight of glass fibers, based on the total weight of the polymeric components of the composition.

Examples 6-19

In each of a further series of experiments, compositions of poly(ethylene terephthalate), copolymer and talc (0.5% based on the weight of polyester) were prepared and injection moulded using the procedure described in Example 1. The conditions of mixing and injection-moulding (where these differed from those described in Example 1) and the properties of the articles so obtained are tabulated below.

| Example | Copolymer | Wt. percent of copolymer in composition | Extrusion temperature, °C. | Moulding conditions Barrel temp., °C. | Moulding conditions Mould temp., °C. | Intrinsic viscosity of poly(ethylene terephthalate) | Notched impact strength of blend, kg. cm./cm.² | Notched impact strength of articles from unmodified polyester | Particle size of copolymer in article, μ |
|---|---|---|---|---|---|---|---|---|---|
| 6 | EMMA(3) | 10 | 250-255 | 265 | 140 | 0.65 | 2.5 | 2.1 | 3-5 |
| 7 | EMMA(3) | 10 | 250-255 | 260 | 140 | 1.1 | 4.2 | 2.85 | 3-5 |
| 8 | EEA(1) | 15 | 255 | 255 | 140 | 0.65 | 2.5 | 2.0 | 1-5 |
| 9 | EEA(1) | 20 | 255 | 255 | 140 | 0.65 | 2.3 | 2.0 | 1-5 |
| 10 | EEA(1) | 10 | 260 | 260 | 140 | 1.1 | 4.6 | 2.9 | 1-5 |
| 11 | EEA(1) | 15 | 260 | 260 | 140 | 1.1 | 5.3 | 2.9 | 1-5 |
| 12 | EEA(1) | 20 | 260 | 260 | 140 | 1.1 | 5.3 | 2.9 | 1-5 |
| 13 | EEA(2) | 15 | 255 | 265 | 140 | 0.65 | 2.7 | 1.9 | <10 |
| 14 | EEA(2) | 20 | 260 | 260 | 140 | 1.1 | 4.8 | 3.1 | <10 |
| 15 | EVA | 10 | 250 | 270 | 140 | 0.65 | 2.1 | 1.9 | 1-10 |
| 16 | EVA | 10 | 250 | 285 | 140 | 1.1 | 4.7 | 3.1 | 2-4 |
| 17 | EHEMA | 10 | 255 | 255 | 170 | 0.65 | 2.3 | 1.8 | 1-25 |
| 18 | EHEMA | 15 | 255 | 255 | 140 | 0.65 | 2.8 | 1.8 | 1-35 |
| 19 | EHEMA | 20 | 255 | 255 | 140 | 0.65 | 2.4 | 1.8 | 1-35 |

Example 20

100 parts of dry poly(ethylene terephthalate) chip having an intrisic viscosity of about 0.6 decilitre gm.$^{-1}$ were blended on a mill at 250° C. for 5 minutes with 100 parts of poorly crystalline tercopolymer (with a melt flow index at 190° C. of about 2) of ethylene (70% by weight), methyl methacrylate (15% by weight) and 2-hydroxyethyl methacrylate (15% by weight). The resultant crepe was masson-cut, dried and compression moulded to give a yellow-white moulding samples of which did not exhibit brittle failure on an impact test.

Example 21

85 parts of the dry poly(ethylene terephthalate) used in Example 20 were dry mixed with 15 parts of a copolymer of ethylene and ethyl acrylate containing approximately 18% by weight of ethyl acrylate and available from Dow Chemicals as "Zetafin" A35 copolymer. The mixture was extruded at about 260° C. in a 1¼ inch bore extruder and the extrudate was chipped. The dried chip was injection moulded at a barrel temperature of about 270° C. and a mould temperature of about 140° C., to form 4½ inch diameter discs.

The average notched impacted strength of 50 mm. x 6 mm. x 3 mm. bars obtained from these discs was about 50% greater than the average notched impact strength of bars obtained from moulding the poly(ethylene terephthalate) along.

What is claimed is:

1. A thick walled shaped article comprising crystallised poly(ethylene terephthalate) having finely dispersed therein discrete particles of an amorphous or poorly crystalline high molecular weight copolymer of ethylene and a carboxylic acid ester containing terminal ethylenic unsaturation, the said copolymer having a glass/rubber transition temperature below 0° C. and a dynamic modulus of not greater than $4 \times 10^9$ dynes/sq. cm., and forming from 1 to 50% by weight of the mixture of poly(ethylene terephthalate) and copolymer.

2. An article as claimed in claim 1 in which the copolymer forms from 5% to 35% by weight of the mixture.

3. An article as claimed in claim 1 in which the particles are less than 10 microns in maximum dimension.

4. An article as claimed in claim 1 which contains a reinforcing amount of glass fibres.

5. A mouldable composition comprising poly(ethylene terephthalate) and an amorphous or poorly crystalline high molecular weight copolymer of ethylene and a carboxylic acid ester containing terminal ethylenic unsaturation, the said copolymer having a glass/rubber transition temperature below 0° C. and a dynamic modulus of not greater than $4 \times 10^9$ dynes/sq. cm., and forming from 1 to 50% by weight of the mixture of poly(ethylene terephthalate) and copolymer.

6. A composition as claimed in claim 5 in which the poly(ethylene terephthalate) has an intrinsic viscosity, measured on a solution of the polymer in o-chlorophenol at 25° C., of at least 0.6 decilitre gram$^{-1}$.

7. A composition as claimed in claim 5 in which the copolymer forms from 5% to 35% by weight of the mixture.

8. A composition as claimed in claim 5 which also contains a reinforcing amount of glass fibres.

9. A composition as claimed in claim 5 which also contains a nucleating agent for the poly(ethylene terephthalate).

10. A composition as claimed in claim 9 in which the nucleating agent is talc or pyrophyllite.

11. A process for producing a shaped article which comprises shaping a composition comprising poly(ethylene terephthalate) and an amorphous or poorly crystalline high molecular weight copolymer of ethylene and a carboxylic acid ester containing terminal ethylenic unsaturation, the said copolymer having a glass/rubber transition temperature below 0° C. and a dynamic modulus of not greater than $4 \times 10^9$ dynes/sq. cm., and forming from 1 to 50% by weight of the mixture of poly(ethylene terephthalate) and copolymer, in a mould heated to 100 to 200° C., and maintaining the composition in the mould until the poly(ethylene terephthalate) has crystallised.

12. A process for producing a shaped article which comprises shaping a composition comprising poly(ethylene terephthalate) and an amorphous or poorly crystalline high molecular weight copolymer of ethylene and a carboxylic acid ester containing terminal ethylenic unsaturation, the said copolymer having a glass/rubber transition temperature below 0° C. and a dynamic modulus of not greater than $4 \times 10^9$ dynes/sq. cm., and forming from 1 to 50% by weight of the mixture of poly(ethylene terephthalate) and copolymer, and subjecting the shaped article to a heat treatment at 120 to 200° C. to crystallise the poly(ethylene terephthalate).

13. A process for producing a shaped article which comprises shaping a composition comprising poly(ethylene terephthalate) and an amorphous or poorly crystalline high molecular weight copolymer of ethylene and a carboxylic acid ester containing terminal ethylenic unsaturation, the said copolymer having a glass/rubber transition temperature below 0° C. and a dynamic modulus of not greater than $4 \times 10^9$ dynes/sq. cm., and forming from 1 to 50% by weight of the mixture of poly(ethylene terephthalate) and copolymer, at a temperature which does not exceed 10° C. above the melting point of the poly(ethylene terephthalate) throughout the shaping process.

14. A composition as claimed in claim 5 in which the carboxylic acid ester is an alkyl ester of acrylic or methacrylic acid in which the alkyl group contains 1 to 8 carbon atoms.

15. A composition as claimed in claim 5 in which the carboxylic acid ester is a vinyl alkanoate.

16. A composition as claimed in claim 5 in which the carboxylic acid ester is a hydroxyalkyl ester of acrylic or methacrylic acid in which the hydroxyalkyl group contains from 1 to 8 carbon atoms.

References Cited

UNITED STATES PATENTS

| | | | |
|---|---|---|---|
| 3,290,411 | 12/1966 | Tsuji et al. | 260—873 |
| 3,397,169 | 8/1968 | Wilkinson | 260—873X |
| 3,405,198 | 10/1968 | Rein et al. | 260—873 |
| 3,435,093 | 3/1969 | Cope | 260—873X |

MORRIS LIEBMAN, Primary Examiner

L. T. JACOBS, Assistant Examiner

U.S. Cl. X.R.

260—873